April 19, 1932.   R. OBLIN   1,855,137
COMBINATION SWITCH
Filed Feb. 6, 1926
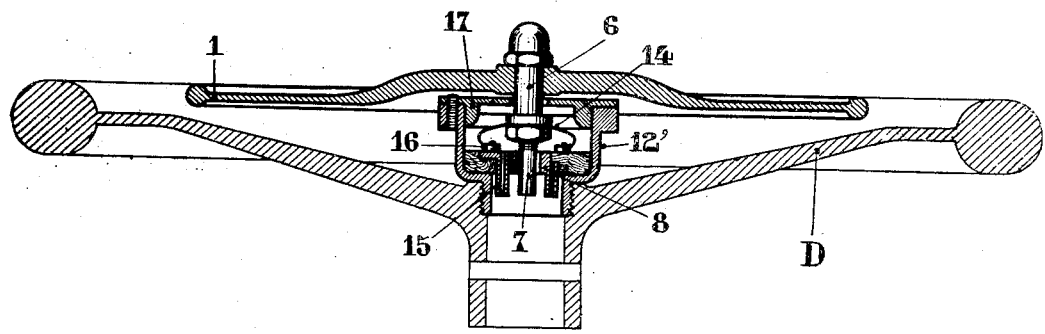

Patented Apr. 19, 1932

1,855,137

UNITED STATES PATENT OFFICE

RAYMOND OBLIN, OF PARIS, FRANCE, ASSIGNOR TO SOCIÉTÉ ANONYME DES NOUVELLES INVENTIONS MECANIQUE ET ELECTRIQUES, OF NEUILLY-SUR-SEINE, FRANCE, A CORPORATION OF FRANCE

COMBINATION SWITCH

Application filed February 6, 1926, Serial No. 86,575, and in France February 24, 1925.

The present invention has for its subject an operating device applicable to the steering wheel or column of automobile vehicles, the device constituting a contactor of multiple use by means of which it is possible, whilst steering the vehicle and without releasing the steering wheel, to actuate either an acoustic signal, or the lighting or extinguishing of the head lamps and lamps or to bring into operation a mechanical operating device such as the handle for the admission of gas, for advancing the ignition and so forth.

Various devices of this character are already known which enable the driver of an automobile vehicle to actuate a sound signal without releasing the steering wheel.

The device which forms the subject of the present invention is more particularly characterized by the combination with means for actuating a sound signal, of means for producing the lighting or extinguishing of the head lamps and lamps, the first result being obtained, in a general manner, by an oscillatory movement of the operating member, whilst the second is obtained by causing the said member to pivot about the axis of the steering column. This new combination of means produces particularly interesting advantages. It is well known that when an automobile is travelling during the night in open country, the driver must extinguish his head lamps or modify his illumination when meeting a vehicle which is coming from the opposite direction. This operation which is usually effected by operating a switch placed on the dash board of the vehicle causes the driver to lean forward and to release the steering wheel with one hand. This is liable to cause a considerable danger which is completely eliminated by the device forming the subject of the invention.

The invention also includes in combination with the arrangements set forth of means for operating a mechanical member of the vehicle.

The figure is a diametrical section showing a combined device permitting of operating the signal and the lighting or extinguishing of the head lamps and the lamps.

In a general manner the operating member, by means of which the sound signal is actuated and by means of which it is possible to light or extinguish the head lamps without releasing the steering wheel, consists of a wheel 1 of a diameter less than that of the steering wheel and arranged concentrically with the latter.

Combined with the operation of the sound signal is that of the lighting and extinguishing of the head lamps. In this case the wheel 1 can carry out two movements. The first, which is an oscillatory movement about its axis, brings into action the sound signal, by contact between a finger 7 and a ring 8. The second which is a rotary movement about the steering wheel is utilized for producing the lighting or extinguishing of the head lamps.

In this form of construction use is made of a spring of particular shape obtained by cutting and folding in a suitable manner a blade of steel so as to form a central apertured part, for receiving the shaft of the wheel 1 and branches 14 (three in number in the form of construction illustrated), these branches forming contacts adapted to come into contact with contacts 15 secured to the bottom of the box 12'. In order to ensure a better operation of the contacts it is preferable, to secure under the bent ends of the branches 14 of the spring, conducting pads 16 adapted to rest on the contacts 15 when the lighting circuit is closed.

The method of using this combined device is very simple. For actuating the signal it suffices to oscillate the wheel 1 in the manner above described so as to bring the finger 7 in contact with a point of the ring 8. In order to effect lighting or extinguishing of the head lamps or the lamps it suffices to turn the wheel 1 about its axis, this rotation producing either the closing of the lighting circuit by the contact of one of the pads 16 with one of the contacts 15, or, on the contrary the opening of the circuit and consequently the extinguishing of the head lamps or the lamps. The arrangement of the lighting circuit in which the blades 14 and the contacts 15 are included does not include any novel feature and it is not necessary to describe it here more fully.

The device illustrated is only given by way of example. The operating wheel 1 may be arranged in any other position in relation to the steering wheel.

The forms of construction of the invention above described have been given so as to enable the device to be applied to an existing steering wheel, the box 12' being screwed in the place of the usual plug.

Having thus described my invention what I claim as new and desire to secure by Letters Patent is:—

1. A multiple switch for use with a motor vehicle steering column comprising, a wheel, a plurality of spring arms adapted to universally and rotatably support said wheel at the extremity of said steering column, a contact rod concentric with said wheel, a fixed contact sleeve concentric with said rod, a contact carried by each of said spring arms, and a plurality of fixed contacts for said first mentioned contacts.

2. A multiple switch for use with a motor vehicle steering column comprising, a wheel, a plurality of spring arms on said wheel, a bearing sleeve of insulating material adapted to support said spring arms, a contact rod concentric with said wheel, a fixed contact sleeve concentric with said rod, a contact carried by each of said spring arms bearing on said first mentioned sleeve and a plurality of fixed contacts embeded in said first mentioned sleeve in the path of the contacts carried by said spring arms.

RAYMOND OBLIN.